United States Patent
Sikorsky et al.

(10) Patent No.: US 6,684,370 B1
(45) Date of Patent: Jan. 27, 2004

(54) METHODS, TECHNIQUES, SOFTWARE AND SYSTEMS FOR RENDERING MULTIPLE SOURCES OF INPUT INTO A SINGLE OUTPUT

(75) Inventors: Michael J. Sikorsky, Calgary (CA); Robert Shaw, Calgary (CA)

(73) Assignee: Thoughtworks, Inc., Chicago, IL (US)

( * ) Notice: Subject to any disclaimer, the term of this patent is extended or adjusted under 35 U.S.C. 154(b) by 470 days.

(21) Appl. No.: 09/690,303

(22) Filed: Oct. 17, 2000

(30) Foreign Application Priority Data

Jun. 2, 2000 (CA) .............................................. 2310943

(51) Int. Cl.[7] .......................... G06F 17/00; G06F 17/24
(52) U.S. Cl. ..................... 715/513; 707/514; 707/501.1
(58) Field of Search ................................. 715/513, 514, 715/500.1, 515, 517, 521; 382/176, 173, 217

(56) References Cited

U.S. PATENT DOCUMENTS

| | | | | |
|---|---|---|---|---|
| 6,055,522 A | * | 4/2000 | Krishna et al. .............. | 715/517 |
| 6,064,397 A | * | 5/2000 | Herregods et al. .......... | 345/630 |
| 6,137,483 A | * | 10/2000 | Kiyono et al. ............ | 715/500.1 |
| 6,175,844 B1 | * | 1/2001 | Stolin .......................... | 715/521 |
| 6,411,731 B1 | * | 6/2002 | Saito .......................... | 382/173 |
| 6,424,980 B1 | * | 7/2002 | Iizuka et al. ................ | 715/513 |
| 6,584,480 B1 | * | 6/2003 | Ferrel et al. ................ | 715/513 |

* cited by examiner

Primary Examiner—Sanjiv Shah
(74) Attorney, Agent, or Firm—Kirschstein, et al.

(57) ABSTRACT

A computer-implemented template provides a structure for a document. The template may provide zero or more region definitions and zero or more placeholders. Region definitions may be associated with data provided in data providers. There are two types of data providers, namely software data providers and non-software data providers. Software data providers provide data through the execution of software code, whereas non-software data providers do not execute software code. A rendering engine renders the template pursuant to a rendering strategy. If a region definition in a template is associated with a region in a single data provider, the rendering engine replaces the region definition in the template with the located region. If a single region definition is associated with two or more regions, the rendering engine and the rendering strategy decide which region to use based upon a predetermined strategy. The placeholders in the template are replaced during the rendering process by their associated globally defined values.

20 Claims, 8 Drawing Sheets

```
<region name="Document Title"> RKO 281: Deconstructing Citizen
Kane </region>

<region name="Document Contents">
This document deconstructs Well's Citizen Kane...
This is just another sentence from the document provider...
</region>
```

FIG. 4a

```
public class DateProvider
{
    public String DateModified()
    {
        return currentDocument.getDateModified();
    }
}
```

FIG. 4b user.name=John Smith

FIG. 4c

```
<region name="DocumentContents">
    <region name="DocumentSummary">
        This document also deconstructs Well's Citizen Kane...
    </region>
    </region name="DocumentLength">0</region> pages
</region>
```

FIG. 4d

```
public class LengthProvider
{
    public String DocumentLength()
    {
        return currentBook.getDocumentLength();
    }
}
```

FIG. 4e

RKO 281: Deconstructing Citizen Kane

This document was last modified on: October 9, 1974

This document deconstructs Well's Citizen Kane...
This is just another sentence from the document provider...

Thank you, John Smith, for viewing the document

FIG. 5a

RKO 281: Deconstructing Citizen Kane

This document was last modified on: October 9, 1974

This document also deconstructs Well's Citizen Kane...
87 pages

Thank you, John Smith, for viewing the document

METHODS, TECHNIQUES, SOFTWARE AND SYSTEMS FOR RENDERING MULTIPLE SOURCES OF INPUT INTO A SINGLE OUTPUT

FIELD OF THE INVENTION

The invention relates to methods, techniques, software and systems for rendering multiple sources of input into a single output.

BACKGROUND OF THE INVENTION

Software developers currently have a number of tools for designing documents and pieces of data to be returned in response to client requests. These tools include various mark up languages such as HTML™ and XML™, for example. These mark-up languages allow a software developer to program using tags. These mark-up languages may contain many different types of tags, requiring different syntax and/or different parameters and the different tags may have different attributes. Applications such as Cold Fusion™, JSP™ (Java Server Pages) and ASP™ (Active Server Pages) involve programming in tags, known as "tag-based scripting" These mark-up languages and applications require a developer to learn a complete, often complex, tag-related syntax to design a document to be returned in response to a client request. Moreover, developers are limited by the functionality of the tags.

It would be desirable to reduce the complexity of a system to design and render documents and improve the ability of a system to adapt if changes are made in the future, which would reduce the effort for development, maintenance and future enhancements of the system.

SUMMARY OF THE INVENTION

According to one aspect, the invention relates to information presentation in a computer system, and deals more particularly with a technique, system, and computer program for applying a polymorphic, inheritance-based approach to render multiple sources of input data into a single output data source. This embodiment provides a methodology for the separation of presentation logic from business logic and data sources.

According to another aspect, the invention provides a computer-readable medium storing computer executable instructions that when loaded in a computer adapts the computer to render a document from: a template which defines a structure for the document, the template comprising zero or more region definitions, each region definition having a region name; zero or more data providers, each data provider comprising one or more regions, each region being associated with a region name, and each data provider being one of either a software data provider and a non-software provider wherein a software data provider provides data resulting from execution of software code and a non-software provider does not provide data resulting from execution of software code; and wherein each region can comprise zero or more further regions and each region can further comprise zero or more further region definitions; by for each region definition in the template: (a) identifying which data providers, if any, are associated with the region name of the region definition; (b) if no data providers are identified in step (a), then returning a default value; otherwise (c) of the data providers identified in step (a), choosing the data providers to be used to provide data in place of the region definition; and (d) generating data from the data providers chosen in step (c) and replacing the region definition in the template with the generated data.

According to yet another aspect, the invention provides a computer-implemented method for creating a document comprising: creating a template defining a structure for the document, the template comprising zero or more region definitions, each region definition having a region name; creating zero or more data providers wherein each data provider comprises one or more regions, each region being associated with a region name; and each data provider is one of either a software data provider and a non-software provider wherein a software data provider provides data resulting from execution of software code and a non-software provider does not provide data resulting from execution of software code; and each region can further comprise zero or more further regions and each region can further comprise zero or more further region definitions; rendering the template, wherein for each region definition in the template, (a) identifying which data providers, if any, are associated with the region name of the region definition; (b) if no data providers are identified in step (a), then returning a default value; otherwise (c) of the data providers identified in step (a), choosing the data providers to be used to provide data in place of the region definition; and (d) generating data from the data providers chosen in step (c) and replacing the region definition in the template with the generated data.

According to yet another aspect, the invention provides a computer system for creating a document, the system comprising input hardware and software for a user to create a template defining a structure of the document, the template comprising zero or more region definitions, each region definition having a region name; and for a user to create zero or more data providers wherein each data provider is associated with one or more region names; a rendering engine and a rendering strategy wherein the combination of the rendering engine and the rendering strategy creates a rendered document by (a) identifying which data providers, if any, are associated with the region name of the region definition; (b) if no data providers are identified in step (a), then returning a default value; otherwise (c) of the data providers identified in step (a), choosing the data providers to be used to provide data in place of the region definition; and (d) generating data from the data providers chosen in step (c) and replacing the region definition in the template with the generated data.

Advantageously, different embodiments of the present invention may permit:

providing a relatively simple technique for rendering input data sources into a single output data source;

providing a rendering technique allowing efficient use of multiple and disparate data sources, such as, for example: plain text documents, HTML documents, XML documents, Software objects, etc;

providing a rendering technique that enables different data retrieval or formatting implementations to be quickly and easily substituted into the computing environment, to quickly adapt to changes in data or formatting requirements, which changes may not currently be foreseeable;

providing a technique that enables new sources of data to be quickly and easily added into a rendering technique, providing greater flexibility in the manner in which the data sources can be rendered, where for example, the new sources or data may override older sources of data, depending upon a rendering strategy;

providing a method for separating presentation logic from business logic and data sources; in other words, a template for a document, for example, may remain the same, even though the logic used to produce data for the template or the data content itself may change;

allowing the separation of dynamic content (eg: information generated through a software method) from static content (eg: a text document) which provides a useful separation of disciplines; such separation of disciplines has several advantages including the ability to distinguish between types of data providers whereby certain types of data providers may be best created or modified by software programmers whereas another type of data provider could be created by anyone, including data entry personnel, whose knowledge of programming techniques would be irrelevant;

providing a polymorphic content replacement algorithm or strategy for selective replacement of data; in other words, such a strategy would allow for, among other things, the ability to change the look and feel of the document to be returned to a client at run time as well as changing the logic used to create the document to be returned;

providing an "inheritance-based" content replacement algorithm by allowing a hierarchical inclusion of regions within regions, which creates increased flexibility and allows for the relatively easy modification or addition of one region within another; and providing a value replacement algorithm for use across multiple document templates and providers of data for the templates, allowing for global use of variables or placeholders, for example.

BRIEF DESCRIPTION OF THE DRAWINGS

Preferred embodiments of the invention will now be described with reference to the attached drawings in which:

FIG. 1b is a block diagram of the organization of computer memory of the devices of FIG. 1a;

DETAILED DESCRIPTION

Figure 1A:
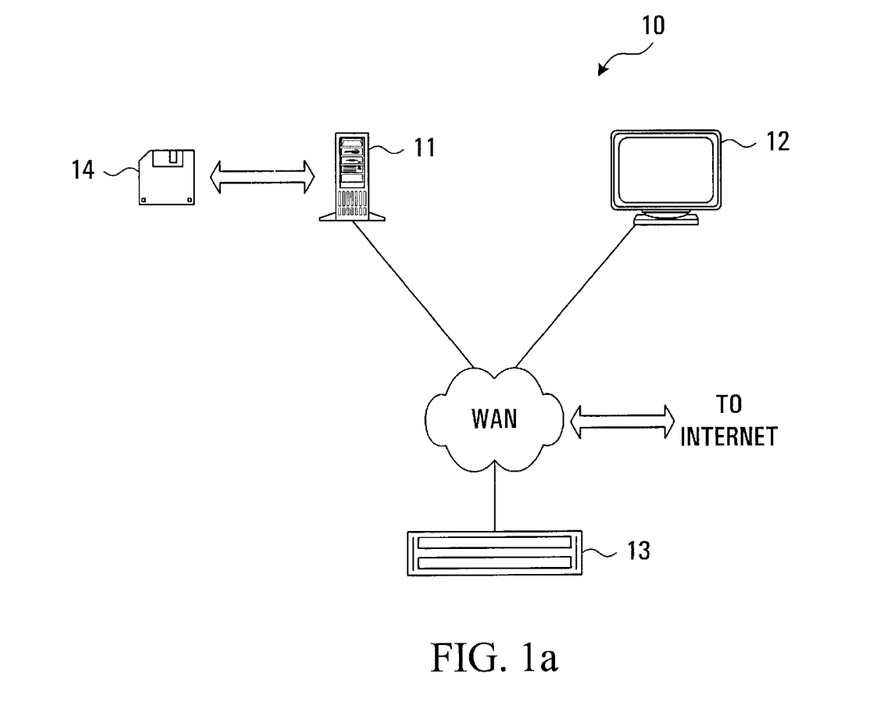
FIG. 1a illustrates multiple network interconnected devices.

FIG. 1a illustrates, by way of example, digital computer network 10 including computing devices 11, 12 and 13. Devices 11, 12 and 13 may, by way of example, be personal computers; mainframe computers; networking equipment such as routers, switches, frame relays; telephone switching equipment; or the like. Network 10 may for example, be a wide area network, conforming to any of a number of known networking protocols including TCP/IP, IPX, Appletalk, UUCP or the like. Alternatively, network 10 may be a local area network; a collection of interconnected smaller computer networks comprising an intranet or internet; or a portion of the public internet. As will be appreciated and as illustrated, network 10 may be interconnected with other networks such as the public internet.

Computing devices 11, 12 and 13 are all network management devices that store network management data, among other things. Management of any of the network devices may be accomplished by access to one device 11, 12 or 13 by one of the other devices 11, 12 or 13, or other interconnected devices (not shown), in communication with network 10.

Each computing device 11, 12, and 13 comprises a processor interconnected with storage memory and a network interface. Additionally, each computing device may comprise an input/output peripheral capable of reading data from a computer readable storage medium, such as a floppy diskette, CD-ROM, tape or the like. Each computing device may also comprise other input and/or output hardware and software.

Figure 1B:
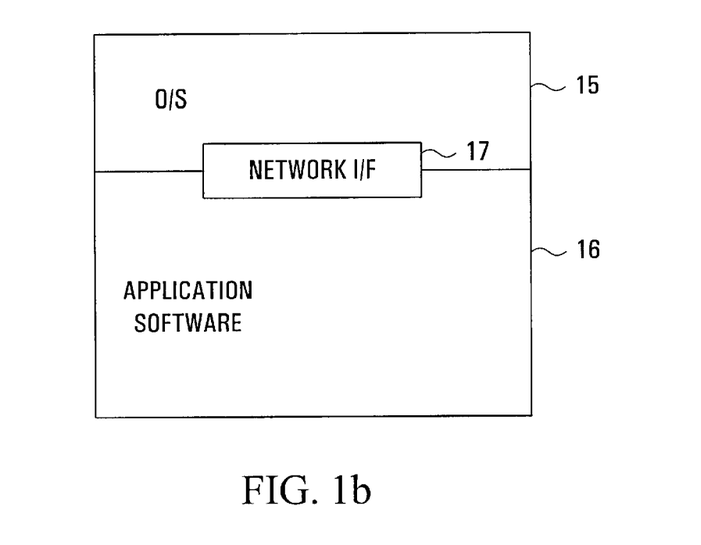

The organization of memory of computing device 11 is illustrated in FIG. 1b. The organization of memory of computing devices 12, and 13 is similar, but not illustrated. As shown, loaded within memory of each computing device is operational software, including preferably an operating system network interface software 17; and application software 16. As will be appreciated, the operational software may be loaded from computer readable storage medium 14.

Operating system 15, may for example be a UNIX operating system. Network interface software 17 typically comprises software allowing communication of device 11 with the remainder of network 10 using a known network protocol. Network interface software 17 may, for example, be an internet protocol suite, and could optionally form part of operating system 15. Application software 16 typically comprises software that in combination with operating system 15, provides other desired functionality of devices 11, 12 and 13.

In a distributed system, certain software and/or hardware is considered as server-side components and other software and/or hardware is considered as client-side components. The software described below could all be resident on a single device 11, 12 or 13. Alternatively, portions of the software described below could be resident on one device 12, for example, and other portions could be resident on one or more other devices 11 and 13, for example.

Figure 2:
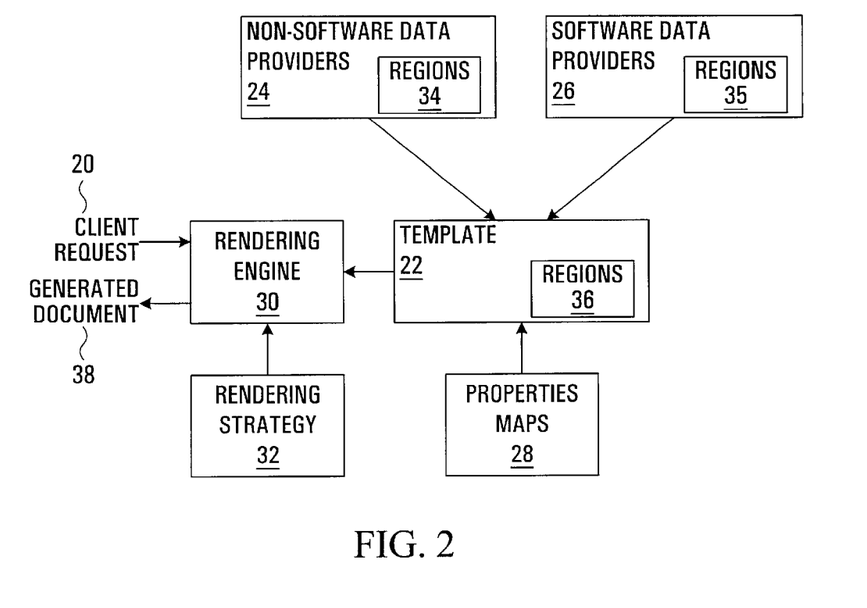
FIG. 2 is a block diagram depicting software and other components in accordance with an embodiment of the present invention.

FIG. 2 is a high level block diagram depicting certain elements of this embodiment and certain of their inputs and outputs. Although data generally flows in both directions between the elements shown in FIG. 2 (for a request and a response), the direction of the arrows generally illustrates that the output of one component is to be used as an input to another component.

Referring to FIG. 2, a template 22, having regions (or region definitions) 36, is conceptually centrally located, receiving inputs from non-software data providers 24 (having regions 34), software data providers 26 (having regions 35) and properties maps 28. The template 22, the data providers 24, 26, the regions 34, 35, 36 and the properties maps 28 represent data stored on one or more of the computing devices 11, 12 and 13. A rendering engine 30, a software component, in combination with a rendering strategy 32, another software component, determines how the data providers 24, 26 and the properties maps 28 are used as inputs to the template 22. The rendering engine 30 receives a client request 20 and ultimately returns a generated document 38 from the template 22.

As suggested above, all of the components 20–36 could be resident on a single device 11, 12 or 13. Alternatively, for example, the client request 20 could originate from one device 12 and the other components 22–36 could be resident on a single device 11 or could be resident on two or more devices 11, 13.

A client request 20 for a document or a piece of data is received by the rendering engine 30, which rendering engine 30 is typically implemented as software. Hereinafter, the term "document" may sometimes be used to refer to either a document or a piece of data. The request 20 is passed to the template 22. As described in greater detail below, information from the data providers 24, 26 and the properties map 28 is rendered or generated into a document 38 according to the structure of the template 22 by the rendering engine 30 pursuant to a strategy dictated by the rendering strategy 32. A generated document 38 is then returned to the client. These elements may be more specifically described as follows.

Template 22

Figure 3A:
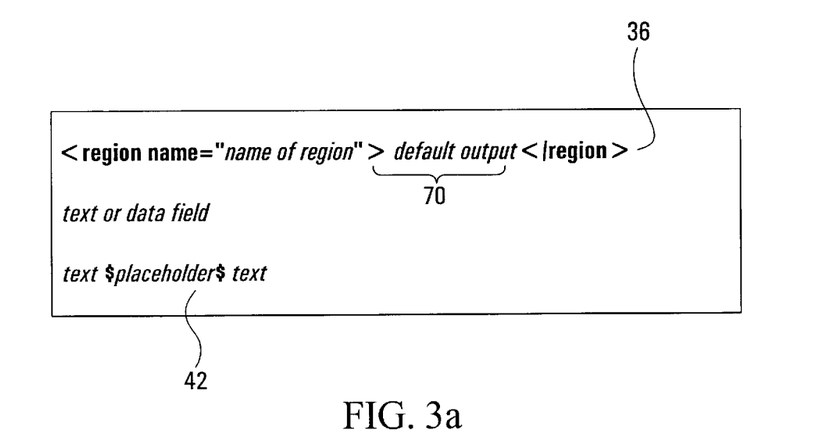
FIG. 3a is a generic example of a sample template in accordance with an embodiment of the present invention.

The template 22 provides the general structure of the resulting document 38. A generic sample template 22 is depicted in FIG. 3a. In conjunction with the rendering engine 30, the template 22 determines where and how the various input data sources (the non-software providers 24, the software data providers 26 and the properties maps 28) are to be merged. As will be discussed below, the template 22 identifies region definitions 36 in a particular sequence. In FIG. 3a, the general type of information to be inserted in the template 22 is depicted in italics. The portions shown in bold can be inserted verbatim. The mark-up language XML is used in this example. However, as noted below, a region can theoretically be defined using other syntaxes or languages.

A region definition 36 is depicted as:

<region name="name of region">default output</region>

The name of the region is added where shown. The default output 70 may also be added where shown. The other portions of the region definition 36, at least for the purposes of this example, would be written as shown.

A user or developer may add text or data anywhere in the template 22, and not just in the places as shown in the sample template 22 of FIG. 3a.

Instead of the term "placeholder" 42 in FIG. 3a, the developer would supply an appropriate variable or placeholder name, such as "user.name" or "country", for example, which would be associated with a globally defined variable. In this example, the symbol "$", when on both sides of a term, signifies a placeholder 42. Ultimately, the rendering engine 30 replaces the placeholder 42 by its globally defined definition or associated value (as described below with respect to the properties map 28).

Figure 3B:
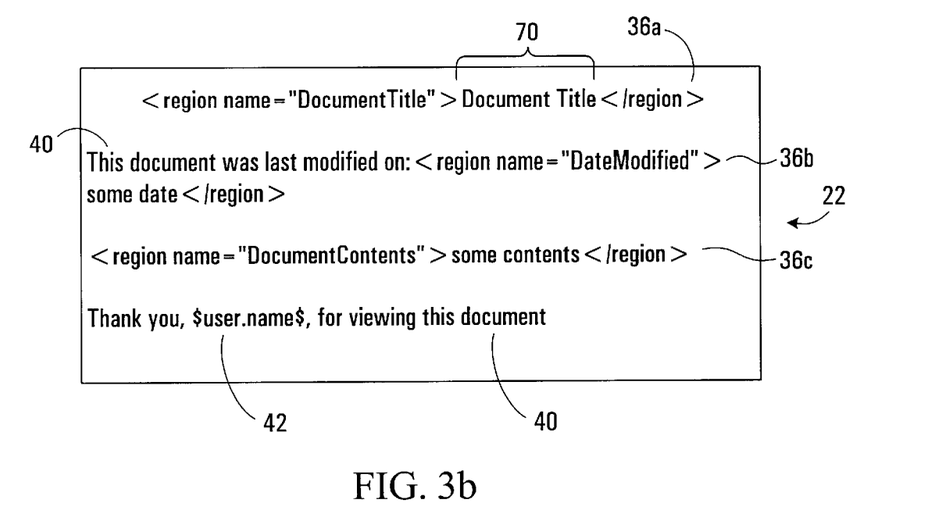
FIG. 3b is an example of a template in accordance with an embodiment of the present invention.

A specific example of a sample template 22 is depicted in FIG. 3b. The template 22 shown in FIG. 3b has region definitions 36a, 36b and 36c. The sample template 22 depicted in FIG. 3b also provides text 40 that will appear in the resulting document 38 in addition to a shared value or a placeholder 42, which in this example, is identified as "user.name".

Regions or Region Definitions 34, 35, 36

In general, a region 34, 35 represents a unit of content or a type of information that may be provided by a non-software data provider 24 or a software data provider 26. A template 22 may include several region definitions 36, each of which may be associated with zero or more regions 34 or 35. Similarly, the data providers 24, 26 may also include region definitions 34, 35. Each region 34, 35 may provide content. The term "region definition" will generally be used to indicate a reference to a region. The term "region" will generally be used to refer to a unit of content associated with a region definition. A region or a unit of content could be provided by a data provider 24, 26, or could also be provided within the template 22, such as for example, with respect to the default content 70 described below. (It is also possible that depending upon the context, the term "region" could refer to either a "region definition" or a "region" as described herein.)

Non-software Providers 24

A non-software provider 24 provides a mechanism by which a data source can be described statically, in the form of a text document, for example. Typically, data provided from a non-software provider 24 does not result from execution of software code. Non-software providers 24 may also introduce new region definitions 34. Inherited or nested regions within a non-software provider 24 are resolved by the rendering engine 30 in combination with the rendering strategy 32, as described below.

Software Data Providers 26

Software data providers 26 provide a mechanism by which a data stream, for example, can be constructed. A software data provider 26 generates data or information by processing computer software code (rather than simply being a text or data file, such as the non-software providers 24). In other words, a software data provider 26 provides data resulting from execution of software code. A software data provider 26 generates information by processing computer software using a computer programming language. Software data providers 26 may also introduce new region definitions 35. Inherited or nested regions within a software data provider 26 are resolved by the rendering engine 30 in combination with the rendering strategy 32.

Properties Maps 28

A properties map 28 provides a global list of values associated with placeholders 42 which can be used by more than one template 22 and/or software data providers 26 and/or non-software data providers 24. In other words, properties maps 28 centralize commonly used and shared values among multiple templates 22, software data providers 26 and non-software data providers 24.

Rendering Engine 30

The rendering engine merges the various data sources (the non-software providers 24, the software data providers 26, the properties maps 28) into a single document based on the structure of the template 22 and the rules dictated by the rendering strategy 32.

Rendering Strategy 32

The rendering strategy may be separate from the rendering engine 30, as shown in FIG. 2, or, according to another aspect of the invention, may be incorporated within the rendering engine 30 (not shown).

If the data providers 24, 26 include two or more regions 34, 35 having the same name, then the rendering strategy 32 determines which region 34, 35 to use. Depending upon how the rendering engine 30 incorporates regions 34, 35 into the template 22, the resulting document 38 could differ. For example, if the data providers 24, 26 include two regions 34, 35 of the same name, then the rendering strategy 32 could choose to use a data provider 24, 26 that was created or added first (using a first-in-first-out (FIFO) strategy) or the rendering strategy could choose to use the data provider 24, 26 that was most recently created or added (using a last-in-first-out (LIFO) strategy).

A LIFO strategy, for example, allows a later created region 34 or 35 to override an earlier created region 34 or 35. Such a LIFO strategy provides an inheritance-type behavior, described further below. Polymorphic behavior is realized by the ability to have regions 34, 35 that provide content dependant on the context of the request. In other words, the rendering strategy 32 provides a flexible method for encapsulating decision logic required by the rendering engine 30 to merge or choose among what could be multiple, possibly overlapping, data sources.

Operational Description

As noted above, FIG. 3b shows a sample template 22. This sample template 22 has three region definitions 36a, 36b and 36c, namely "DocumentTitle", "DateModified" and "DocumentContents", respectively. The sample template 22 of FIG. 3b also refers to "user.name", which is a placeholder 42. Typically, before the template 22 is rendered, the regions 34, 35 associated with the region definitions 36a, 36b and 36c in addition to the placeholder 42 will have been previously defined or programmed within the data providers 24, 26 and properties maps 28 as described below (otherwise, a default output 70 or an error message will be produced).

Figure 4A:
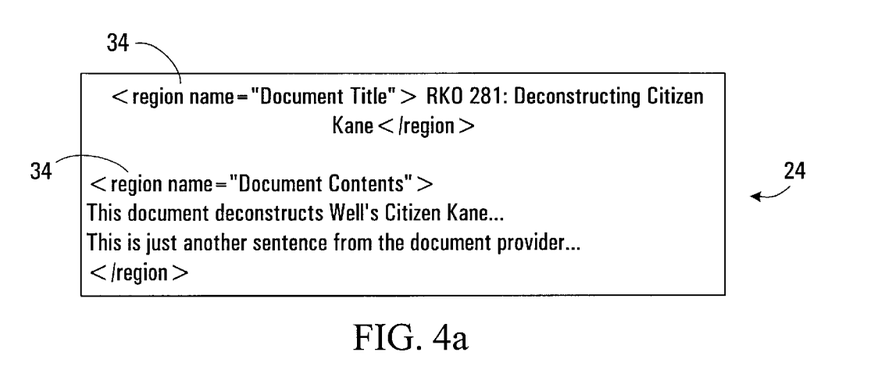
FIG. 4a is an example of a non-software data provider in accordance with an embodiment of the present invention.

FIG. 4a shows a sample non-software data provider 24. The sample non-software provider 24 defines two regions. The content of the region named "DocumentTitle" is the following text: "RKO 281: Deconstructing Citizen Kane". The content of the region named "DocumentContents" provides text to be included as the body of a review concerning the movie Citizen Kane, in this example.

Figure 4B:
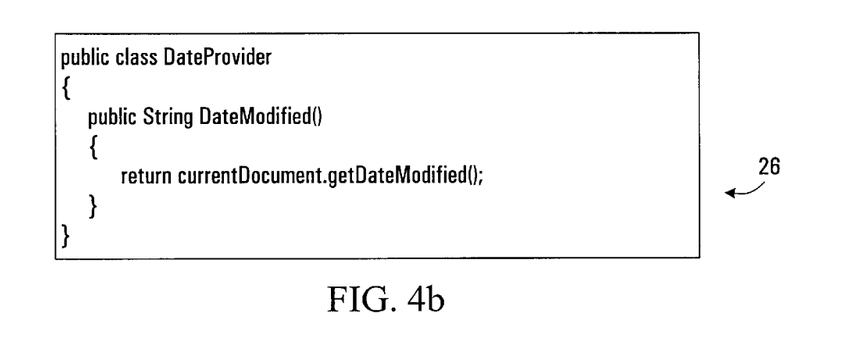
FIG. 4b is an example of a software data provider in accordance with an embodiment of the present invention.

FIG. 4b shows a sample software data provider 26. The sample software provider 26 includes a region named "DateModified". In this example, the content of this region is a piece of Java code. However, the code could be in any language that can be compiled or interpreted by the user's system. In this example, the piece of Java code returns the date on which the above noted region "DocumentContents" 34 of FIG. 4a was last modified.

Figure 4C:
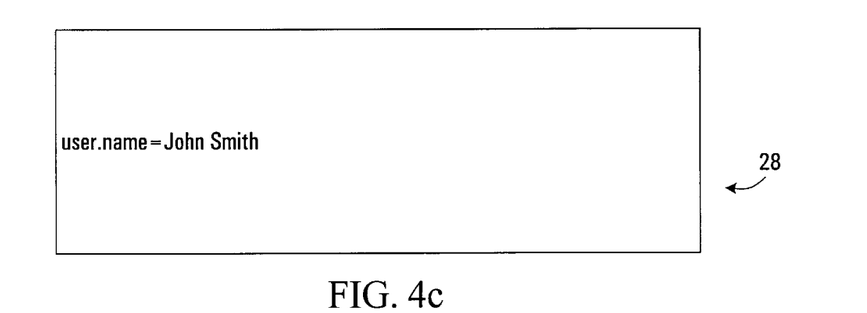
FIG. 4c is an example of a properties map in accordance with an embodiment of the present invention.

FIG. 4c shows a sample properties map 28. In this case, the sample properties map 28 defines or associates "user.name" as "John Smith". The properties map 28 could be a lookup table or any other method or technique for assigning values, or definitions or strings to variables or placeholders.

Flow Chart

A high level algorithm for rendering a template 22 will be now be described. As background for this example, a user using the device 12 (FIG. 1a), for example, may be visiting a web site devoted to movie reviews, and the user may have selected a review for the movie Citizen Kane. A client request for the document "RKO 281:Deconstructing Citizen Kane" would then be sent to the rendering engine 30, resident on the device 11 (FIG. 1a), for example. Then, the rendering engine 30 locates the appropriate template 22, which in this case, is the template shown in FIG. 3b. (Alternatively, the client request 20 could be sent to an appropriate Java template object (not shown), for example, which in turn would invoke the rendering engine 30.) The rendering engine 30 then traverses the region definitions 36a, 36b and 36c contained in the template 22 and queries the data providers 24, 26 to provide content associated with the region definitions 36a, 36b, and 36c, as shown in flow chart of FIG. 6, and as further described below.

Figure 6:
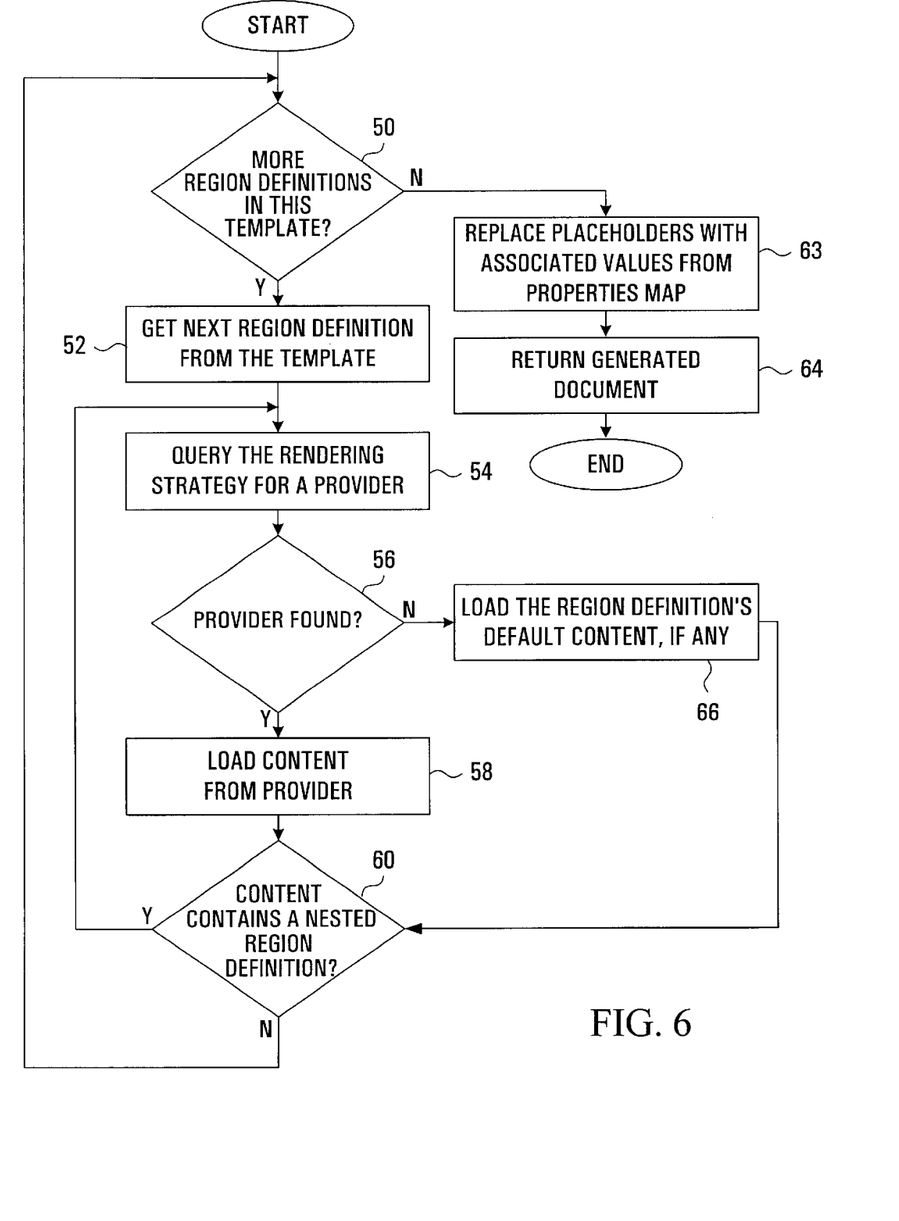
FIG. 6 is a flow chart illustrating steps performed by a rendering engine in accordance with an embodiment of the present invention.

Referring to FIG. 6, at step 50, the rendering engine 30 determines if there are any yet to be rendered region definitions 36 in the template 22. In this example, the first region definition "DocumentTitle" 36a will be located at step 52. In cases where there is more than one data provider 24, 26 having the region name being searched for, a rendering strategy, as shown at step 54, is required to determine which data providers 24, 26 to use. In this example, there is only a single region 36 named "DocumentTitle" within the data providers 24, 26 which is that shown in FIG. 4a, and which will be located at step 56. At step 58, the contents of the region named "DocumentTitle" will be added to the document 38 being generated in place of the region definition "<region name="DocumentTitle">Document Title</region>".

Because it is possible for one region 34 or 35 to include another region 34 or 35 (or another region definition 34 or 35), step 60 determines if one region (or region definition) 34 or 35 is nested within another region 34 or 35. In this case, because no region is nested within the "DocumentTitle" region, the flow chart returns to step 50 to determine if there are more region definitions 36 in the template 22.

In this example, because there is an additional region definition "DateModified" 36b in the template 22, the rendering engine 30 proceeds to step 52 to obtain the associated content. At steps 54 and 56, the software data provider 26 (as shown in FIG. 4b) is located. At step 58, the Java code shown in FIG. 4b is executed and the result replaces the reference to the "DateModified" region definition 36b in the template 22. At step 60, because the Date Modified region of FIG. 4b does not contain a nested region definition 35, the flow chart returns to step 50.

At steps 50 and 52, the rendering engine determines that the next region definition 36 is "DocumentContents" 36c. At steps 54, 56 and 58 the rendering engine 30 replaces the reference to the "DocumentsContent" region definition 36c in the template 22 with the content of the "DocumentContents" region shown in FIG. 4a.

The rendering engine 30 now returns to step 50. Because there are no more region definitions 36 in the template 22, the rendering engine proceeds to step 63. At step 63, the rendering engine 30 looks for placeholders or values 42 in the template 22 or in any added regions 34, 35 which are defined by the properties maps 28. At step 63, the rendering engine 30 replaces the placeholders 42 with the associated values or strings from the properties maps 28. In the example template 22 shown in FIG. 3b, the placeholder 42 is named "user.name" and is delimited by the "$" symbol. The rendering engine 30 replaces "$user.name$" with the value or definition shown in the properties map 28 of FIG. 4c, namely "John Smith". In this example, the placeholders 42 are replaced at the end of the rendering process. However, the rendering engine 30 could replace the placeholders 42 with their associated values or definitions from the properties maps 28 at any time during the rendering process.

If a placeholder 42 does not appear in a properties map 28, then a default value may be used. For example, as one possibility, if a placeholder 42 does not appear in a properties map 28, the placeholder 42 may remain unresolved. Therefore, if in the above noted example, there were no properties map 28, the final document 38 of FIG. 5a would show "$user.name$" instead of "John Smith".

Figure 5A:
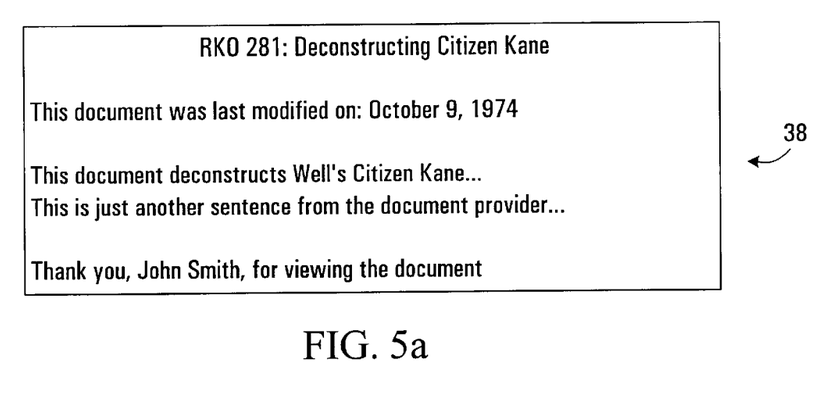
FIG. 5a is an example of a document generated from the template of FIG. 3b.

At step 64, the rendering engine 30 returns the generated document 38, which in this example, will look like document 38 shown in FIG. 5a.

It is possible that a region definition 36 may be included in the template 22 even though there is no associated region 34 or 35 in a non-software provider 24 or in a software data provider 26. In that case, the rendering engine 30 should have a strategy for proceeding. One strategy is suggested in the flow chart of FIG. 6 at step 66, where the rendering engine 30 loads the region definition's default content, if any.

For example, referring to FIG. 3b, if the "DocumentTitle" region 36a had no corresponding region defined by the non-software providers 24 or the software data providers 26, then the rendering engine 30 would, in this example, simply use the default content 70 from the region definition 36a of the template 22. In this example, as shown in FIG. 3b, the default content 70 is "DocumentTitle", which is the text between "</region>" and the preceding ">" symbol. Therefore, in this example, the resulting document 38 (not shown) instead of that shown in FIG. 5a would include the text "DocumentTitle" in place of "RKO 281:Deconstructing Citizen Kane". (Another default option is simply to produce an error or default message such as "no associated region defined".)

LIFO Strategy

Figure 4D:
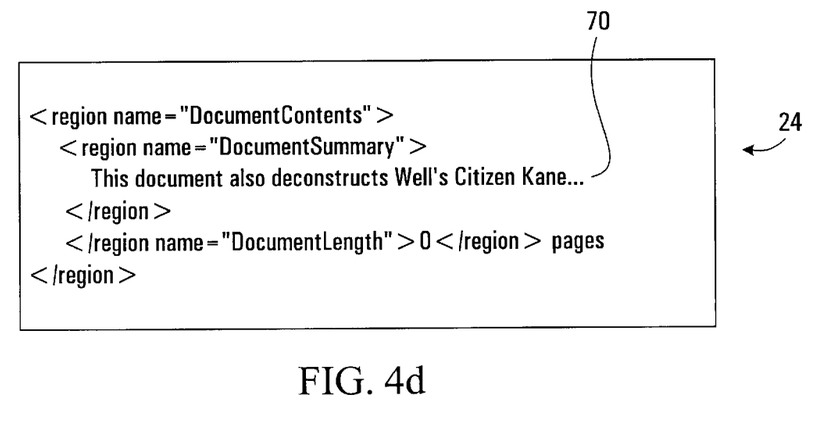
FIG. 4d is an example of another non-software data provider.
Figure 4E:
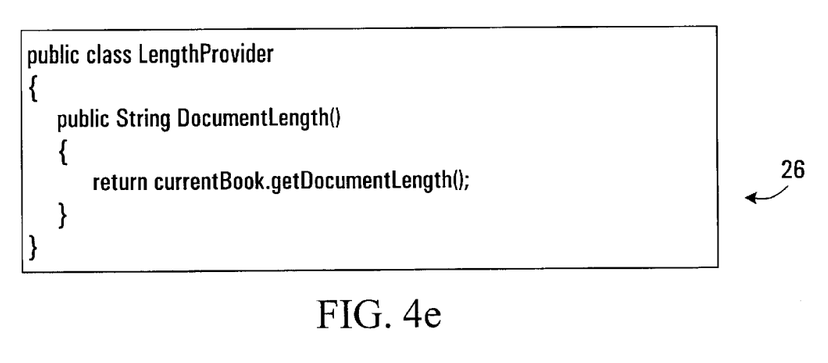
FIG. 4e is an example of another software data provider.

As noted above, different rendering strategies 32 are possible. In cases where it is desirable to have more recently defined regions 34, 35 override earlier defined regions, a LIFO strategy may be preferred. To illustrate the LIFO strategy, the template 22 shown in FIG. 3b will be considered in conjunction with the data providers 24, 26, and properties maps 28 shown in FIGS. 4a–4c. As well, for this example, additional data providers 24, 26 as shown in FIGS. 4d and 4e will be considered. For the purpose of this example, the data providers 24, 26 shown in FIGS. 4d and 4e will be considered to have been added more recently than the data provider 24 shown in FIG. 4a.

The example template 22 shown in FIG. 3b will now be rendered pursuant to the flow chart in FIG. 6. The first two region definitions "DocumentTitle" 36a and "DateModified" 36b are rendered in a manner identical to that described above. However, the "DocumentContents" region definition 36c is rendered differently because of the recent addition the non-software data provider 24 shown in FIG. 4d. Because there are now two regions within the data providers 24, 26 associated with the name "DocumentContents", one shown in FIG. 4a and one shown in FIG. 4d, a rendering strategy 32 is implemented to determine which one will be used. A sample rendering strategy 32 is shown in flow chart of FIG. 7.

Figure 7:
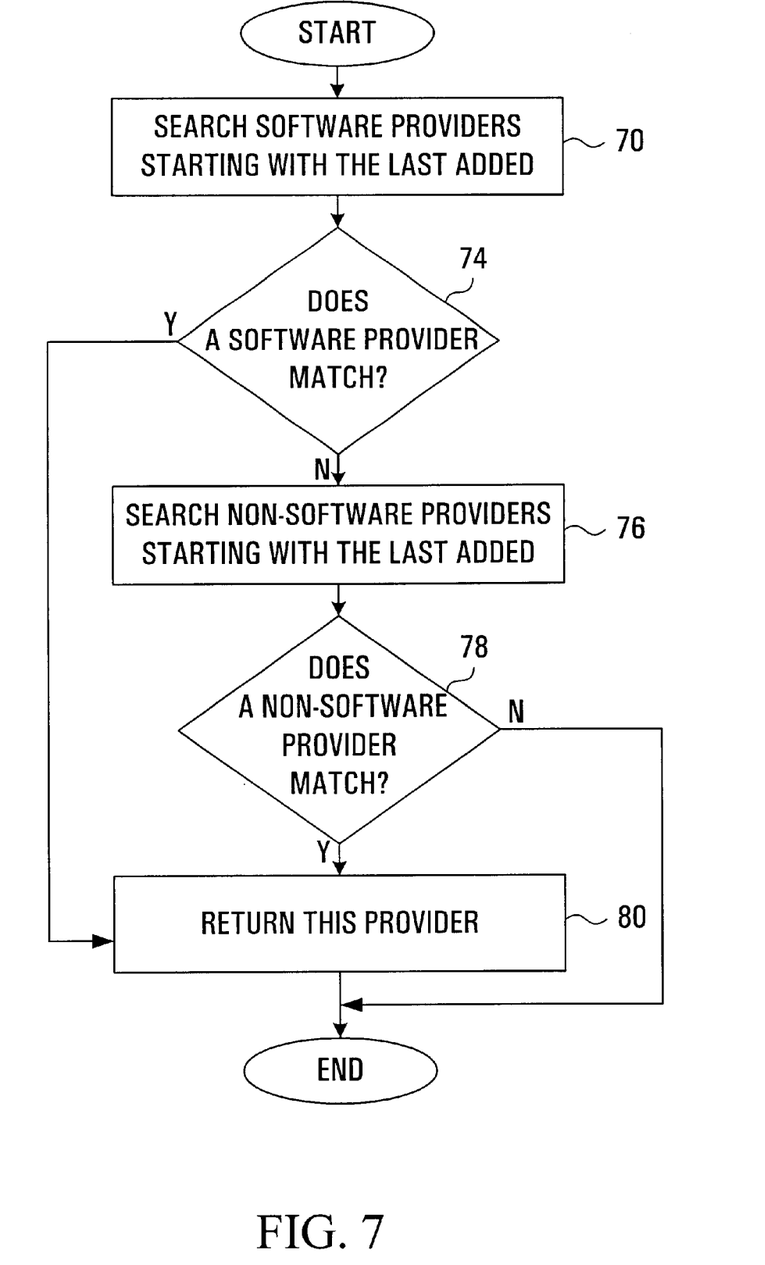
FIG. 7 is a flow chart illustrating steps performed by a rendering engine pursuant to a last-in-first-out rendering strategy in accordance with an embodiment of the present invention.

Two distinct strategies have been implemented in the chart shown in FIG. 7. First, if there are two data providers having regions of the same name, the rendering strategy 32 will select a software data provider 26 in preference to a non-software provider 24. If there are two or more software data providers 26 having regions of the same name, the rendering strategy 32 will use the most recently added software provider 26. If there are two or more non-software providers 24 having regions of the same name (and no software providers having a region of the same name), the rendering strategy 32 will use the most recently added non-software provider 26, pursuant to the LIFO strategy.

Accordingly, at step 54 of FIG. 6, the rendering engine 30 will follow the flow chart of FIG. 7 to implement the above-described example of a rendering strategy. At step 70 of FIG. 7, the rendering strategy 32 searches the software data providers 26 for a region named "DocumentContents", starting with the last added software data provider 26. At step 74, the rendering engine 30 determines that there are no software data providers 26 having a region named "DocumentContents". Accordingly, the rendering engine considers the non-software data providers 24 at step 76. At step 78, the rendering engine 30 locates the most recently added non-software data provider 24 shown in FIG. 4d and at step 80 of FIG. 7 returns this provider 24 to step 56 of the flow chart of FIG. 6.

At step 60 of FIG. 6, the rendering engine 30 determines that the region definition "DocumentSummary" is nested within the "DocumentContents" region. Accordingly, the rendering engine 30 returns to step 54 to render the "DocumentSummary" region definition. The rendering engine 30 follows the steps shown in the flow chart of FIG. 7 to render the "DocumentSummary" region. At step 74, the rendering engine 30 finds no software data provider 26 having a "DocumentSummary" region. Accordingly, at step 76 of FIG. 7, the rendering engine 30 searches the other non-software data providers 24 for a "DocumentSummary" region. At step 78, the rendering engine 30 finds no "DocumentSummary" region. Accordingly, at step 66 of FIG. 6, because no provider was located at step 56, the rendering engine 30 loads the default content 70 from the "DocumentSummary" region definition of FIG. 4d. In other words, the rendering engine 30 loads "This document also deconstructs Well's Citizen Kane . . . "

The rendering engine 30 then proceeds to step 60 to determine that there is another nested region definition (namely the "DocumentLength" region definition) located within the "DocumentContents" region. The "DocumentLength" region is provided in the software data provider 26 shown in FIG. 4e. In this example, the software provider 26 shown in FIG. 4e is a piece of Java code. The rendering engine 30 will have the Java code executed and will then return a value representing the document length, which value will be inserted in place of the Document Length region definition of FIG. 4d.

Figure 5B:
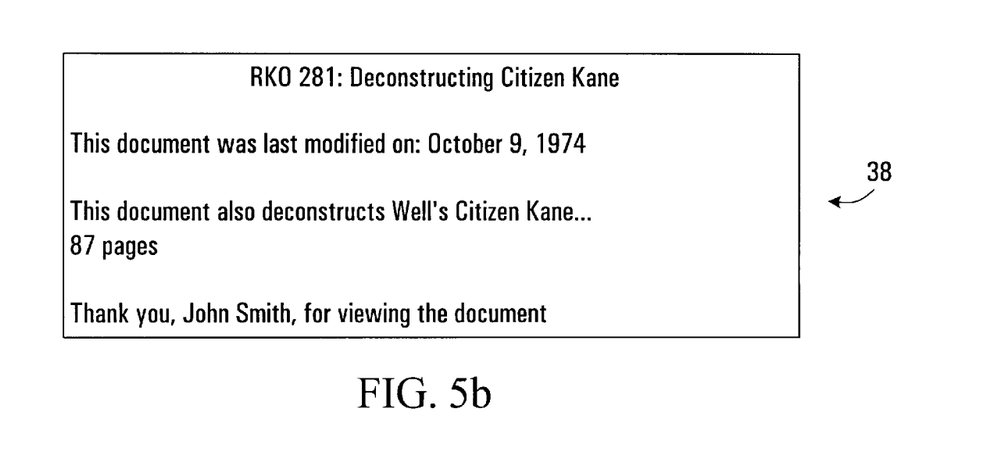
FIG. 5b is an example of a document generated from the template of FIG. 3b, using the document data providers of FIGS. 4d and 4e.

The resulting rendered document 38 is shown in FIG. 5b.

By way of further example, if the data provider shown in FIG. 4d were considered to be a software data provider 26 instead of a non-software data provider 24, the resulting document 38 as shown in FIG. 5b would be the same. To illustrate, the rendering strategy 32 would proceed through steps 70–74 of FIG. 7 and determine that there is a software data provider 26 having a region named "DocumentContents", namely that shown in FIG. 4d. Accordingly, the rendering strategy 32 proceeds to step 80 where it returns the most recently added software provider 26 having the name "DocumentContents" shown in FIG. 4d. The rendering strategy 32 would then return to step 54 of FIG. 6 and proceed as noted above. The resulting document 38, as indicated above, and as shown in FIG. 5b, would be the same, as when FIG. 4d is properly considered as a non-software data provider 24.

The above example considered a LIFO rendering strategy 32 where the software data providers 26 were used in preference to the non-software providers 24. Therefore, if regions having a particular name were defined in both a software data provider 26 and a non-software provider 24, the software data provider 26 would be used instead of the non-software provider 24.

However, the rendering strategy 32 could be modified in any number of different ways. For example, the rendering strategy could:

consider the non-software providers 24 before the software data providers 26;

use a first-in-first-out (FIFO) strategy instead of a LIFO strategy;

use a developer-defined priority strategy where the developer, during the creation of the data providers, assigns a priority value to each data provider (not shown). In this scenario, during rendering, if there are two or more data providers having the same region name, the data provider having the highest priority is used.

Figure 3C:
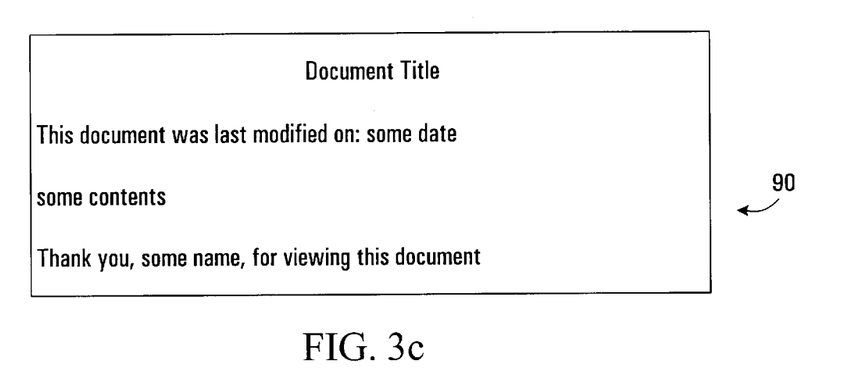
FIG. 3c is an example of a template outline in accordance with an embodiment of the present invention.

Creating templates 22, data providers 24, 26, properties maps 28, etc. and then linking them Construct a Template Outline FIG. 3c illustrates a high level sample template outline 90 of a template 22 that could be created prior to creating a template 22. The template outline 90 could be created in any word processing program, for example, by a software developer or anyone else, who may or may not be familiar with any programming languages. Although the creation of a template outline 90 is not necessary for the ultimate creation of a template 22, the outline 90 may be useful. Among other advantages, the outline 90 allows a person designing the template 22 to provide an outline at a high level, relatively quickly, because details can be omitted and because adherence to rules of a programming language need not be considered. Accordingly, it is not necessary for the person creating the template outline 90 to be competent in a programming language.

The template outline 90 of FIG. 3c shows the basic region names, and placeholders that will make up the ultimate template 22. In other words, the locations of the region definitions 36a, 36b and 36c relating to title, date and document contents have been specified in addition to the location of the placeholder 42 for the user's name.

Transform Template Outline 90 to Template 22

In this example, the template outline 90 of FIG. 3c is transformed to the template 22 as shown in FIG. 3b. There are two basic methods for producing the transformation. The first method is simply to have a developer replace the references to region definitions and placeholders with the proper syntax and content as shown in FIG. 3b. In that case for example, the developer would replace "DocumentTitle" in FIG. 3c with the first line as shown in FIG. 3b. (The language shown for the template 22 of FIG. 3b is XML. However, any syntax or language could theoretically be used.) This method may be referred to as a manual transformation.

The second method involves an automatic or semiautomatic transformation from the template outline 90 to the template 22. In this method, a parser (not shown) is used which recognizes certain key words and translates those key words into the proper syntax for region definitions and placeholders adding content as required. Therefore, for example, the parser would recognize the character string "Document Title" and replace it automatically with the region definition 36a shown on the first line of FIG. 3b. Similarly, the parser would recognize "some name" and replace it automatically with the placeholder "$user.name$".

It should be noted that with respect to the template 22 shown in FIG. 3b, all of the region definitions 36a, 36b, 36c share the same mark-up schema; there is no differentiation between which region definitions relate to non-software providers 24 as opposed to software data providers 26. (It should also be noted that the data providers 24, 26 may use the identical mark-up schema or a different mark-up schema as the region definitions 36 in the template 22 and the region definitions 34, 35.) Accordingly, the person who creates the template 22 need only know a single syntax rule.

Construct Non-software Providers 24

The non-software providers 24, similar to the software data providers 26, can theoretically be created at any time prior to rendering, using input and/or output hardware and software known to those skilled in the art. The non-software providers 24 will likely usually be created by a word processing program or text editor and may appear in a form similar to that shown in FIG. 4a.

Construct Software Data Providers 26

As noted above, in the usual case, the software data providers 26 can theoretically be created at any time prior to rendering (although the result produced by the software data provider 26 may only be known at run time, depending upon the particular case). FIG. 4b illustrates a sample software data provider 26. In this example, the software data provider 26 is a piece of Java code which returns a date. However, a software data provider 26 could theoretically use any language that can be interpreted or compiled by the local environment.

Construct Properties Maps 28

The properties maps 28 could be created at any time prior to rendering. A sample properties map 28 is shown in FIG. 4c. The properties maps 28 link placeholders to their assigned values. The properties maps 28 could be implemented by numerous different techniques known to those skilled in the art, including look-up tables.

Link providers 24, 26 and properties maps 28 to the template 22

The template 22 is linked to the non-software providers 24, the software data providers 26 and the properties maps 28. This linking may be accomplished prior to the rendering process.

Invoke the Rendering Process

This process was described above with respect to FIGS. 6 and 7.

Numerous modifications and variations of the present invention are possible in light of the above teachings. It is therefore to be understood that within the scope of the appended claims, the invention may be practised otherwise than as specifically described herein.

What we claim as our invention is:

1. A computer-readable medium storing computer executable instructions that when loaded in a computer adapts the computer to render a document from: a template which defines a structure for the document, the template comprising zero or more region definitions, each region definition having a region name; zero or more data providers, each data provider comprising one or more regions, each region being associated with a region name, and each data provider being one of either a software data provider and a non-software provider wherein a software data provider provides data resulting from execution of software code and a non-software provider does not provide data resulting from execution of software code; and wherein each region can comprise zero or more further regions and each region can further comprise zero or more further region definitions; by for each region definition in the template:
(a) identifying which data providers, if any, are associated with the region name of the region definition;
(b) if no data providers are identified in step (a), then returning a default value; otherwise
(c) of the data providers identified in step (a), choosing the data providers to be used to provide data in place of the region definition; and
(d) generating data from the data providers chosen in step (c) and replacing the region definition in the template with the generated data.

2. The computer-readable medium of claim 1 wherein choosing which of the data providers are to be used comprises a rendering strategy comprising selecting a data provider based upon a predetermined strategy or else returning a default value.

3. The computer-readable medium of claim 2 wherein the predetermined strategy is one of first-in-first-out, wherein if two or more data providers are associated with the same region name then, among those data providers, the rendering strategy is adapted to select the data provider added first;

last-in-first-out, wherein if two or more data providers are associated with the same region name, then, among those data providers, the rendering strategy is adapted to select the data provider added last; and a priority-based strategy determined by a priority level assigned to each data provider.

4. The computer-readable medium of claim 3 wherein if a software data provider and a non-software provider are both associated with the same region name, then the rendering strategy is adapted to select the software data provider in preference to the non-software provider.

5. The computer-readable medium of claim 4 wherein if two or more data providers are associated with the same region name, and where any of the two or more data providers is a software data provider, then the rendering strategy is adapted to select one of the two or more software data providers based upon a predetermined strategy.

6. The computer-readable medium of claim 5 wherein if none of the two or more data providers is a software data provider, then the rendering strategy is adapted to select one of the two or more data providers based upon a predetermined strategy.

7. The computer-readable medium of claim 6 wherein the rendering strategy is last-in-first-out.

8. The computer-readable medium of claim 1 wherein generating data from the data providers comprises for each data provider determining if the region associated with the region name specifies text or data and if so, returning the text or data;

if the region associated with the region name specifies computer code in a programming language then the rendering engine causes the computer code to be executed and returns the result; and if the region comprises any further region definitions, then the region is rendered by means of the rendering engine by for each further region definition listed in the region:

(a) identifying which data providers, if any, are associated with the region name of the further region definition;

(b) if no data providers are identified in step (a), then returning a default value; otherwise (c) of the data providers identified in step (a), choosing the data providers to provide data in place of the further region definition; and (d) generating data from the data providers chosen in step (c) and replacing the further region definition in the region with the generated data.

9. The computer-readable medium of claim 1 wherein the template further comprises zero or more placeholders;

and the rendering engine in rendering a document considers zero or more properties maps wherein each properties map includes a list of one or more placeholders wherein each placeholder has an associated value or string;

wherein for each placeholder in the template, the rendering engine considers the zero or more properties maps and if a reference to the placeholder appears in the zero or more properties maps, the rendering engine replaces the reference to the placeholder in the template with the associated value or string.

10. A computer-implemented method for creating a document comprising:

creating a template defining a structure for the document, the template comprising zero or more region definitions, each region definition having a region name;

creating zero or more data providers wherein each data provider comprises one or more regions, each region being associated with a region name; and each data provider is one of either a software data provider and a non-software provider wherein a software data provider provides data resulting from execution of software code and a non-software provider does not provide data resulting from execution of software code; and each region can further comprise zero or more further regions and each region can further comprise zero or more further region definitions;

rendering the template, wherein for each region definition in the template, (a) identifying which data providers, if any, are associated with the region name of the region definition;

(b) if no data providers are identified in step (a), then returning a default value; otherwise (c) of the data providers identified in step (a), choosing the data providers to be used to provide data in place of the region definition; and (d) generating data from the data providers chosen in step (c) and replacing the region definition in the template with the generated data.

11. The method of claim 10 wherein if two or more data providers are associated with the same region name, then the method chooses one of the two or more data providers based upon a predetermined strategy.

12. The method of claim 11 wherein the predetermined strategy is one of first-in-first-out, wherein if two or more data providers are associated with the same region name, then, among those data providers, the rendering strategy selects the data provider added first;

last-in-first-out, wherein if two or more data providers are associated with the same region name, then, among those data providers, the rendering strategy selects the data provider added last; and a priority-based strategy wherein the rendering strategy selects a data provider based upon a priority level assigned to each data provider.

13. The method of claim 12 wherein one or more region definitions can be nested within another region definition.

14. The method of claim 10 wherein generating data from the data providers comprises for each data provider determining if the region associated with the region name specifies text and/or data and if so, returning the text and/or data;

if the region associated with the region name specifies instructions in a programming language then the method further causes the instructions to be executed and returns the result; and if the region comprises any further region definitions, then the region is rendered by (a) identifying which data providers, if any, are associated with the region name of the further region definition;
(b) if no data providers are identified in step (a), then returning a default value; otherwise
(c) of the data providers identified in step (a), choosing the data providers to provide data in place of the further region definition; and
(d) generating data from the data providers chosen in step (c) and replacing the further region definition in the region with the generated data.

15. The method of claim 14 wherein if two or more data providers are associated with the same region definition, then the rendering strategy chooses one of the two or more data providers based upon a predetermined strategy wherein if a software data provider and a non-software provider are both associated with the same region definition, the predetermined strategy will use the software data provider in preference to the non-software provider.

16. The method of claim 15 wherein if two or more data providers are associated with the same region definition, and where any of the two or more data providers are software data providers, then the rendering strategy chooses one of the two or more data providers based upon a predetermined strategy.

17. The method of claim 16 wherein if none of the two or more data providers is a software data provider, then the rendering strategy chooses one of the two or more data providers based upon a predetermined strategy.

18. The method of claim 17 wherein the predetermined strategy is last-in-first-out.

19. The method of claim 10 wherein the template further comprises zero or more placeholders wherein each placeholder relates to a desired value or string.

20. A computer system for creating a document, the system comprising input hardware and software
for a user to create a template defining a structure of the document, the template comprising zero or more region definitions, each region definition having a region name; and
for a user to create zero or more data providers wherein each data provider is associated with one or more region names;

a rendering engine and a rendering strategy wherein the combination of the rendering engine and the rendering strategy creates a rendered document by
(a) identifying which data providers, if any, are associated with the region name of the region definition;
(b) if no data providers are identified in step (a), then returning a default value; otherwise
(c) of the data providers identified in step (a), choosing the data providers to be used to provide data in place of the region definition; and
(d) generating data from the data providers chosen in step (c) and replacing the region definition in the template with the generated data.

* * * * *